547

Jan. 21, 1969 W. SCHREMPP 3,423,591

DEVICE FOR DETERMINING MEAN VALUE OF TWO OPPOSITE PERIPHERAL COORDINATES OF A SOLAR IMAGE

Filed May 5, 1966

INVENTOR
Winfried Schrempp
By Mueller and Toren
ATTORNEYS

United States Patent Office 3,423,591
Patented Jan. 21, 1969

3,423,591

DEVICE FOR DETERMINING MEAN VALUE OF TWO OPPOSITE PERIPHERAL COORDINATES OF A SOLAR IMAGE

Winfried Schrempp, Neubiberg, Germany, assignor to Bolkow Gesellschaft mit beschrankter Haftung, Ottobrunn near Munich, Germany Filed May 5, 1966, Ser. No. 547,960
Claims priority, application Germany, May 13, 1965, B 81/906
U.S. Cl. 250—203 15 Claims
Int. Cl. G01j *1/20*

Figures 1, 2:
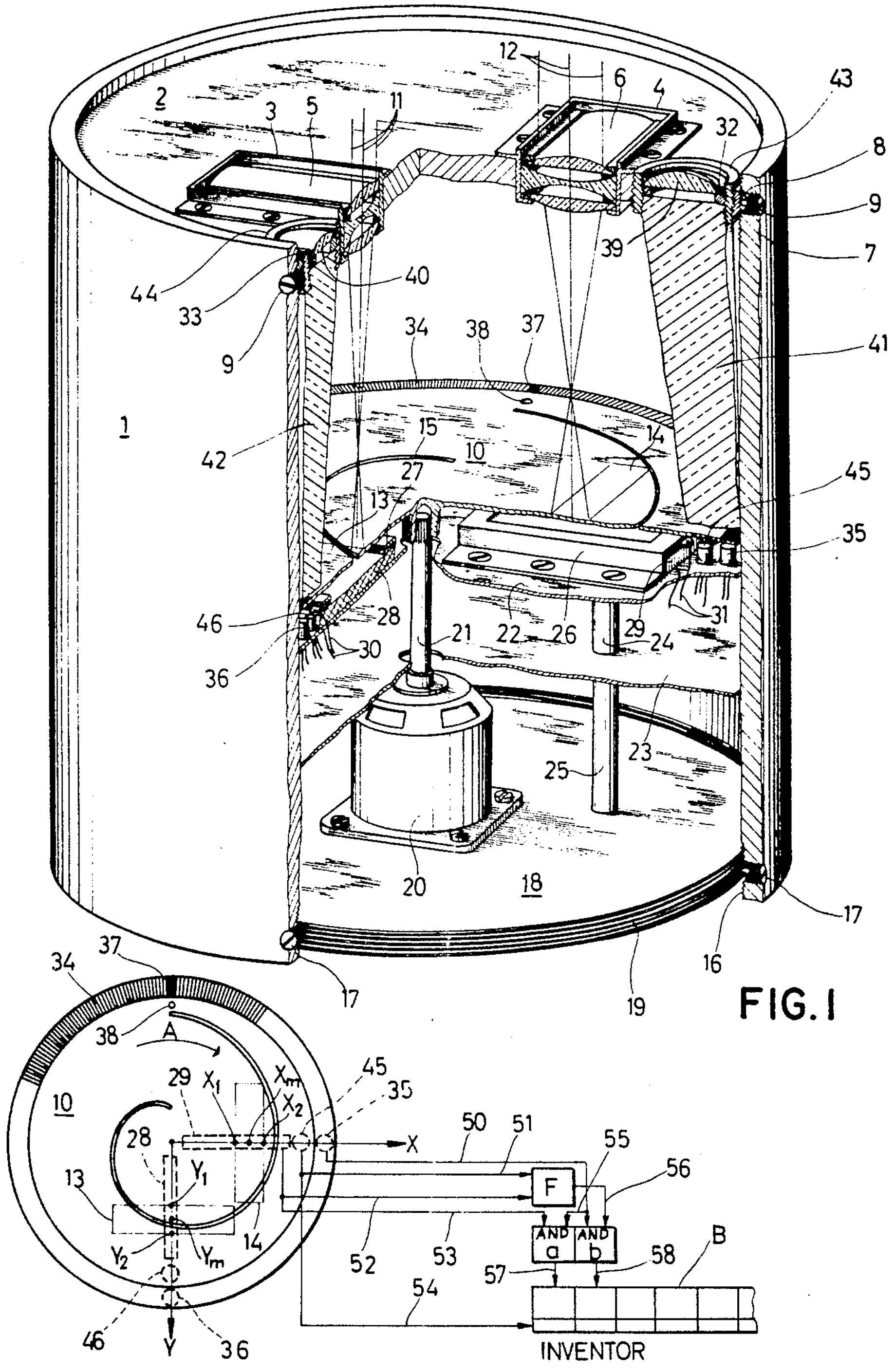

This invention relates to solar sighting and, more particularly, to a novel device for forming a numerical value proportional to the mean value of two opposite peripheral coordinates of a solar image, utilizing digital means.

Due to the eccentricity of the terrestrial orbit relative to the sun, the solar disk appears at an angle which is variable between 31.5′ and 32.5′. In the case of instruments which must be focused on the sun with the aid of a solar image projected by optical means, and where the off-position or deviation to be measured should be equal to or less than one angular minute, the variability of the apparent sun diameter must be taken into account.

A simple geometric consideration will show that the center coordinates of a solar image, projected into a plane and circularly limited, are independent of the image diameter and are always directly proportional to the off position or deviation angles of the instrument relative to the direction of incident light.

An object of the present invention is to provide a simple device for forming a numerical value proportional to the mean value of two opposite peripheral coordinates of a solar image displaceable in a plane in two directions.

Another object of the invention is to provide such a device in which the formation of the numerical value is effected by digital means.

A further object of the invention is to provide such a device comprising a monaxially distorted anamorphotic lens system and having, in the image reproduction plane, a rotating disk with a slit type diaphragm aperture beneath which there is located an elongated photoelectric converter whose longitudinal axis or center line extends normal to the longitudinal axis or diameter of the distorted solar image.

Still another object of the invention is to provide a device of the type just described including an electronic arrangement in which the photoelectric converter, an angle coder driven as a function of the rotating disk, and a binary counter are connected in such a manner that the binary counter is adjustable to a numerical value proportional to two opposite peripheral coordinates of the solar image.

A further object of the invention is to provide, in a device of the type mentioned, a diaphragm aperture in the form of a single thread Archimedean spiral.

Yet another object of the invention is to provide a device of the type mentioned in which the angle coder includes a light raster arranged concentrically on the rotating disk and which is scannable photoelectrically and has radial divisions extending through 360° of its circumference.

A further object of the invention is to provide a device including such an angle coder as just mentioned, and in which the light raster has a starting mark wider than a division of the raster, and which is operable to reset the binary counter after each full revolution of the rotating disk.

Still another object of the invention is to provide a device of the type mentioned including only solid state components, such as electronic or photoelectric switches which are, to a high degree, free from trouble and maintenance, and which responds substantially instantaneously.

A further object of the invention is to provide a device of the type mentioned and including digital means, and in which the digital means includes AND circuits having outputs connected to the last stage and the second last stage of the binary counter, respectively.

A further object of the invention is to provide a device of the type mentioned which is reproduced in duplicate in a common camera housing and with the measuring axes of the two devices being at an angle to each and with both devices utilizing the same rotating disk.

In accordance with the invention as set forth in the objects mentioned above, it is advantageous that the electronic arrangement includes relatively simple digital subassemblies, and that the accuracy of the indication is independent of the aging of the components used, of voltage fluctuations in the current supply, and of the angular velocity of the disk. Slight off-positions of the solar image transversely to the measuring axis have no influence upon the accuracy of the measurement.

The light raster has associated therewith a reproduction lens system whose axis is parallel to the optical axis of the instrument and which includes an illumination lens system in operative association with a photoelectric converter of high resolving power located beneath the light raster and illuminated by the illumination lens system which is located above the light raster. By thus using the rotating disk not only as a scanning device for the projected solar image but also as an essential part of the angle coder, the expenditure for the mechanical means is very substantially reduced.

The binary counter is reset to zero after each full revolution of the disk by means of a switch, and in accordance with the invention, this switch is operable by the rotating disk and is particularly designed as a photoelectric switch. For this purpose, the disk is provided with a bore which, during rotating of the disk, passes through the area illuminated by the above mentioned illumination lens system and in this area there is arranged, beneath the disk, a photo-transistor acting as a switch.

The AND circuit connected to the last stage of the binary counter is controlled from the elongated photoelectric converter and from the photoelectric converter, having a high resolving power, arranged beneath the light raster. The AND circuit connected to the second last stage of the binary counter is controlled through the high resolving power photoelectric converter mentioned, and through a flip-flop having its input connected to the elongated photoelectric converter and to the photo-transistor.

When the device is duplicated in a common camera housing, as mentioned above, there are two binary counters. In these binary counters, there appear numerical counts proportional to the mean values of opposite peripheral coordinates of a solar image projected on the coordinate axes of the two systems. The two numerical values thus indicate the position of the center of the sun with reference to the plane of projection.

For an understanding of the principles of the invention, reference is made to the following description of a typical embodiment thereof as illustrated in the accompanying drawings.

In the drawings:

FIG. 1 is a simplified oblique parallel projection of a camera housing cut open, with two devices in accordance with the invention mounted within the housing; and FIG. 2 is a top plan view, on a reduced scale, of the rotating disk, and also a schematic wiring and block diagram of the electrical arrangement for one measuring axis.

Referring to FIG. 1, a camera housing 1 is illustrated as partially cut away. On the end of housing 1 facing toward the incident light, there is a front plate 2 having mounts 3 and 4 in which are arranged the monaxially distorting anamorphotic reproduction lens systems 5 and 6, respectively. These lens systems are arranged in such a manner that their longitudinal axes or center lines are normal to each other.

Front plate 2 has a male thread 8 threadably engageable in a female thread 7 within housing 1 adjacent its front end. By means of the interengaging threads 7 and 8, in association with set screws 9 threaded into housing 1, plate 2 may be adjusted relative to a disk 10 which is mounted for rotation in the reproduction plane of the camera. The adjustment is effected in such a manner that the light ray paths 11 and 12 of the lens systems 5 and 6, respectively, form two sharp reproductions or solar images 13 and 14 of the sun (not shown), the solar images being located at infinity with respect to the optical axis of the lens systems. Solar images 13 and 14 have their longitudinal center lines or longer diameters normal to each other, and are scanned transversely of their longitudinal extent by a slit type diaphragm aperture 15 in disk 10, the diaphragm aperture being in the form of a single thread Archimedean spiral.

Camera housing 1 is provided with a bottom closure plate 18 having a male thread 19 engageable in a female thread 16 within housing 1 adjacent its bottom end. Bottom 18 is secured in angularly adjustable position by means of one or more set screws 17 threaded into housing 1. An electric motor 20 is mounted on bottom closure 18 and is driven from a suitable source of potential which has not been illustrated in order to simplify the drawing. Disk 10 is secured to shaft 21 of motor 20. Through the medium of spacers 24 and 25, upper and lower partitions or plates 22 and 23 are mounted on bottom closure 18 and serve to mount the electronic components. Only the most important electronic components are shown, on plate or partition 22, in order to provide a clear illustration.

The housings 26 and 27 of elongated photoelectric converters 28 and 29 are mounted on upper partition or plate 22. These photoelectric converters perpendicularly bisect the longitudinal center lines or axes of the elongated solar images 13 and 14. The output leads 30 and 31 of converters 28 and 29, respectivley, have a potential as long as diaphragm aperture 15 is scanning the zones of the images 13 and 14 disposed over the respective converters 28 and 29. The further processing of the output potentials of the converters 28 and 29 will be described hereinafter with reference to FIG. 2.

Revolutions of disk 10 are scanned by means of two angle coders. Each angle coder comprises an illumination lens system 32 or 33 secured in sockets 43, 44, respectively, mounted in front plate 2 of the camera housing 1. The angle coders conjointly include a light raster 34 arranged on the circumference of rotating disk 10, and also include photoelectric converters 35 and 36 having high resolving power. Light raster 34 has a starting mark 37 which is substantially wider, circumferentially of the light raster, than a raster division.

Raster 34 is illuminated by the sun by means of illumination lens systems 32 and 33 and the incident light is gathered by converging lens 39 and 40, respectively, and transmitted to rasters 34 through light conduction rods 41 and 42, respectively. During rotation of disk 10, voltages pulses are thus produced in photoelectric converters 35 and 36.

Disk 10 is formed with a bore or aperture 38 which, during rotation of the disk, passes through the zone illuminated by light conduction rods 41 and 42. By virtue of the light from conduction rods 41 and 42 passing through bore 38 during rotation of disk 10, two phototransistors 45 and 46, mounted on plate or diaphragm 22, are thus illuminated. The photoelectric converters 28, 29, 35 and 36, and the photo-transistors 45 and 46, are connected to an electronic arrangement whose construction and action mechanism will be described with reference to FIG. 2 in which all parts corresponding to FIG. 1 are designated by the same reference characters as used in FIG. 1.

Referring to FIG. 2, in which disk 10 is illustrated to a smaller scale in top plan view, the disk revolves in the direction of the arrow A. Through the medium of reproduction lens systems 5 and 6, there are produced, on disk 10, the two monaxially distorted images 13 and 14, respectively, of the sun, these images being in the plane of infinity with respect to the optical axis of lens systems 5 and 6, respectively.

The images 13 and 14 have a position in which their longitudinal center lines or axes are normal to each other. In the illustrated example, the device is focused on the sun approximately free of error. This means that the optical axes of reproduction lens systems 5 and 6 extend substantially parallel to the perpendicularly incident light and that the mean value coordinates $x_m$ and $y_m$ have numerical values which are valid for the focused system. However, if the optical axes of either or both of the reproduction lens systems 5 and 6 extend at an angle to the direction of perpendicularly incident light, images 13 and 14 migrate along the axes $y$ and $x$, respectively, and the numerical values of the mean value coordinates thereof are proportional to the included angles between the direction of perpendicularly incident light and the optical axes of the associated reproduction lens systems 5 and 6.

Determination of the mean value of the coordinates is effected by the single thread Archimedean spiral diaphragm aperture 15 in disk 10. As disk 10 rotates, the elongated photoelectric converters 28 and 29, beneath the disk 10 and extending normally to the longitudinal axes of the images, are illuminated. Raster 34, arranged along the circumference of the disk 10 and having a starting mark 37 wider than a division of the raster, is illuminated by the illumination lens systems 32 and 33. During rotation of disk 10, the raster produces, in the high resolving power photoelectric converters 35 and 36 beneath the raster, voltage pulses whose number is proportional to the angle of rotation of disk 10. The start of counting is effected by the starting mark 37. The bore 38 in disk 10 provides, through the medium of photo-transistors 45 and 46 positioned beneath disk 10, erasing pulses for resetting the counting device.

With reference to FIG. 2, the evaluation of the pulses obtained from the photoelectric converters will be described with reference to the electronic arrangement represented for the $x$ axis. A similar electronic arrangement is provided for the $y$ axis, but has been omitted from FIG. 2 to simplify the arrangement. During a revolution of disk 10, a binary counter B is set to the count value "0" by an erasing pulse from photo-transistor 45 connected in the erasing circuit indicated at 54. This erase pulse is released or triggered at the instant bore 38 of disk 10 passes over photo-transistor 45, which latter then becomes conducting by virtue of the illumination incident thereupon. Photo-transistor 45 is also connected, through a line 51 to a flip-flop F. The interaction of photo-transistor 45, when releasing or triggering a pulse, and flip-flop F operates to set flip-flop F in a position in which, at the input of an AND circuit $b$ connected between flip-flop F and the second last stage of binary counter B there is formed a "1."

Photoelectric converter 35, which has a high resolving power, has light raster 34 moving thereover during rotation of disk 10. This causes photoelectric converter 35 to produce pulses which are conducted to the before-mentioned AND circuit $b$ and to AND circuit $a$ whose output is connected to the last stage of binary counter B. The voltage pulses from converter 35 arriving at the through-connected AND circuit $b$ and the blocked AND circuit $a$ are supplied to the second last stage of binary counter B. Thereby, these particular pulses are counted double until diaphragm aperture 15 enters solar image 14 at the peripheral coordinate $x_1$. The resulting voltage increase at the output of elongated photoelectric converter 29, which is connected to flip-flop F through line 52 and to AND circuit $a$ through line 53, transfers flip-flop F into its other output position. AND circuit $a$ then becomes conducting, while AND circuit $b$ is blocked. Thus the signals from converter 35 arrive at the last stage of binary counter B and are counted once.

This state is preserved until diaphragm aperture 15 leaves solar image 14 at the peripheral coordinate $x_2$. With the resultant drop of the voltage applied to AND circuit $a$ from converter 29, AND circuit $a$ is blocked and the counting is terminated. In binary counter B, there now stands the number $x_1+x_2$ which is proportional to the mean value $x_m$ to be determined, according to the following applicable equation:

$$x_m=\frac{x_1+x_2}{2}=\frac{2x_1+(x_2-x_1)}{2}$$

After a full revolution of disk 10, following an erase pulse from photo-transistor 45, the cycle is repeated.

If necessary, known pulse-forming stages may be arranged in lines 50 through 53, although these have not been shown in the drawing. Such stages would produce steep pulse flanks especially for the pulses transmitted in line 53.

While a specific embodiment of the invention has been shown and described in detail to illustrate the principles of the invention, it will be understood that the invention may be embodied otherwise without departing from such principles.

What is claimed is:

1. A device for forming a numerical value proportional to the mean value of two opposite peripheral coordinates of the solar image, said device comprising, in combination, lens means operable to form, in its image plane, an image of the sun substantially elongated along one diameter; a diaphragm disk mounted for rotation in said image plane and having said image appearing on its upper surface, said diaphragm being formed with a slit progressively scanning said image, during rotation of said disk, between a leading peripheral coordinate $x_1$ extending along one edge of said image and a trailing peripheral coordinate $x_2$ extending along the opposite edge of said image; driving means rotating said disk; an elongated photoelectric converter positioned beneath said disk and perpendicularly intersecting said one diameter of said image; means operable, responsive to rotation of said disk, to produce a series of pulses corresponding in number to the angular displacement of said disk from a zero reference position; a plural stage binary counter; and electronic means, including said photoelectric converter, connected to said counter and operable to supply said pulses to one stage of said counter only during rotation of said disk from said reference position to a first position wherein said slit scans the coordinate $x_1$, and to supply said pulses to the next succeeding stage of said counter only during rotation of said disk from said first position to a second position wherein said slit scans the coordinate $x_2$; whereby said binary counter provides a numerical value proportional to the mean value $x_m$ of said peripheral coordinates $x_1$ and $x_2$.

2. A device, as claimed in claim 1, in which said slit is in the form of a single-thread Archimedean spiral.

3. A device, as claimed in claim 1, in which said electronic means includes means operable, responsive to passage of said disk through said zero reference position, to reset said counter to 0.

4. A device, as claimed in claim 1, in which said electronic means includes a first AND circuit connected to said one stage of said counter and a second AND circuit connected to said next succeeding stage of said counter, and means operable, responsive to passage of said disk through said zero reference position, to trigger said first AND circuit conductive and to block said second AND circuit and, responsive to said slit scanning the coordinate $x_1$ to trigger the second AND circuit conductive and to block said first AND circuit; said last named means, responsive to said slit scanning said coordinate $x_2$, blocking said second AND circuit to terminate the counting.

5. A device, as claimed in claim 4, in which said last named means comprises a flip-flop stage having its input connected to said photoelectric converter and to means operable, responsive to passage of said disk through said zero reference position, and having its output connected to the input of said first AND circuit.

6. A device for forming a numerical value proportional to the mean value of two opposite coordinates of a solar image, said device comprising, in combination, a monaxially distorting anamorphotic reproduction lens system forming, in its image plane, an image of the sun substantially elongated along one diameter; a diaphragm disk mounted for rotation in said image plane and having said image appearing on its upper surface, said diaphragm being formed with a slit progressively scanning said image, during rotation of said disk, between a leading peripheral coordinate $x_1$ extending along one edge of said image and a trailing peripheral coordinate $x_2$ extending along the opposite edge of said image; driving means rotating said disk; an elongated photoelectric converter positioned beneath said disk and having its longitudinal dimension perpendicularly intersecting said one diameter of said image; an angle coder driven as a function of said rotating disk; a plural stage binary counter; and electronic means interconnecting said photoelectric converter, said angle coder and said binary counter connected in a manner such that said binary counter is operated by counting pulses at the output of said angle coder to provide a numerical value proportional to the mean value $x_m$ of said peripheral coordinates $x_1$ and $x_2$ of said image.

7. A device, as claimed in claim 6, in which said electronic means is operable to supply counting pulses to one stage of said counter during rotation of said disk from a zero reference position to a first position wherein said slit scans the coordinate $x_1$ and to supply counting pulses to the next succeeding stage of said counter only during rotation of said disk from said first position to a second position wherein said slits scans the coordinate $x_2$.

8. A device, as claimed in claim 6, in which said diaphragm slit is in the form of a single thread Archimedean spiral.

9. A device, as claimed in claim 1, in which said angle coder is a light raster arranged on said disk with radial divisions extending through an angle of 360°; and a second photoelectric converter operable to scan said light raster to provide counting pulses to said counter.

10. A device, as claimed in claim 9, in which said light raster includes a zero reference indication which is circumferentially wider than the remainder of said radial divisions.

11. A device, as claimed in claim 10, including an illumination lens system arranged with its optical axis parallel to the optical axis of said reproduction lens system and positioned above said light raster; said second converter being a high resolving power converter positioned beneath said light raster.

12. A device, as claimed in claim 11, including an electronic switch connected to said binary counter and operable to reset said binary counter to 0 after a full rotation of said disk.

13. A device, as claimed in claim 12, in which said electronic switch is a photo-transistor; said disk being forward with an aperture therethrough passing through the zone illuminated by said illumination lens system, said photo-transistor being arranged beneath said rotating disk at a position to be intercepted by said aperture.

14. A device, as claimed in claim 13, in which said electronic means includes a first AND circuit having its output connected to the last stage of said counter, a second AND circuit having its output connected to the second last stage of the binary counter; said first AND stage being controlled by said first mentioned elongated photoelectric converter and by said second photoelectric converter; said second AND circuit being controlled by said second photoelectric converter; and a flip-flop stage having its input connected to said first elongated photoelectric converter and said photo-transistor and its output connected to the input of said second AND circuit.

15. A device, as claimed in claim 6, arranged within the housing of a camera, said device being duplicated with respect to said reproduction lens system and said elongated photoelectric converter to provide two systems having in common said rotating disk, said counter and said angle coder; and said electronic means being duplicated; the reproduction lens systems having respective axes *x* and *y* which include an angle therebetween.

References Cited

UNITED STATES PATENTS

| | | | |
|---|---|---|---|
| 3,122,644 | 2/1964 | Greenlee et al. | 250—203 |
| 3,191,038 | 6/1965 | Lannan | 250—203 |
| 3,230,377 | 1/1966 | Smith | 250—203 |

JAMES W. LAWRENCE, *Primary Examiner.*

C. R. CAMPBELL, *Assistant Examiner.*

U.S. Cl. X.R.

95—11; 250—208